July 22, 1941.      E. C. HORTON      2,250,331
WINDSHIELD CLEANER
Filed Dec. 19, 1939
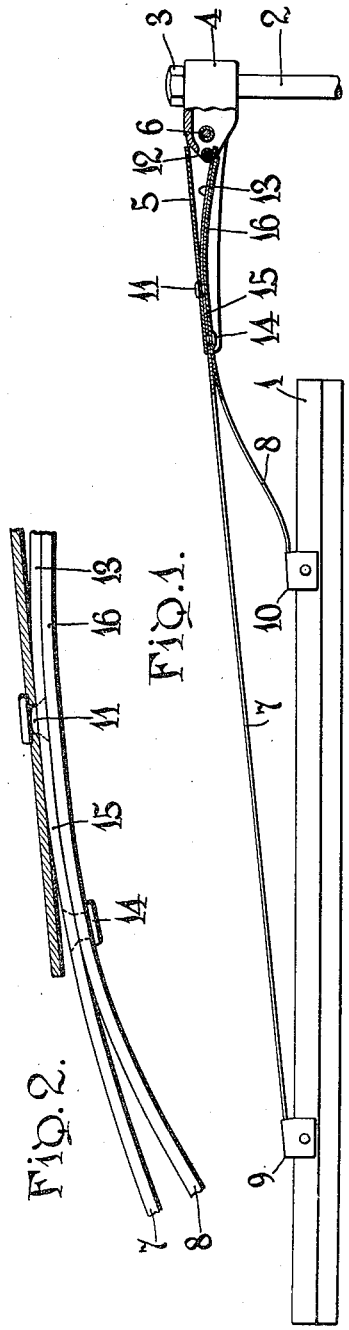
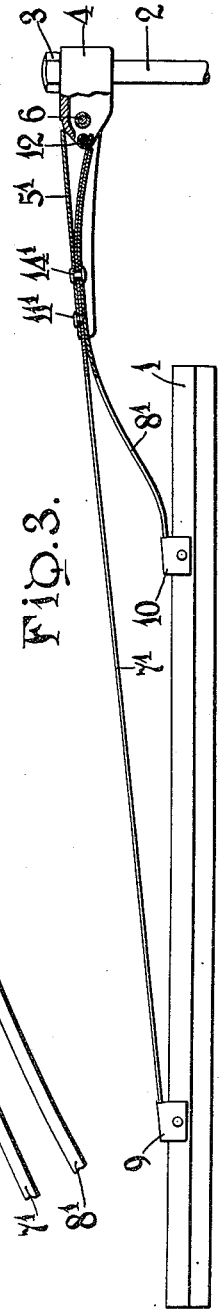
INVENTOR
Erwin C. Horton,
BY
Bean, Brooks, Buckley & Bean.
ATTORNEYS Patented July 22, 1941

2,250,331

UNITED STATES PATENT OFFICE 2,250,331

WINDSHIELD CLEANER

Erwin C. Horton, Hamburg, N. Y., assignor to Trico Products Corporation, Buffalo, N. Y.

Application December 19, 1939, Serial No. 310,008

7 Claims. (Cl. 15—255)

This invention relates to a windshield cleaner and particularly to the mounting of the wiper by which the windshield glass is cleaned.

Ordinarily the wiping blade is connected midway of its length to its actuating arm and is reciprocated over the glass in an arcuate path. Certain of the larger windshields require extra long wiping blades, and owing to their extreme length the central attachment to the actuating arm has been subjected to excessive strain under certain unfavorable conditions. For instance, if the extreme end of the blade contacts matter adhering to the glass, it will tend to twist the blade in its mounting. Furthermore, by reason of the arcuate movement the outer end of the blade travels a much greater distance than the inner end making it difficult to secure uniform wiping contact at both ends.

The primary object of the present invention is to provide a mounting especially adapted for the longer dimensioned blades, whereby the respective end portions will effectively function and result in greater cleaning efficiency.

In the drawing depicting two forms of the invention

Fig. 1 illustrates in side elevation one embodiment of the wiper mounting;

Fig. 2 is a fragmentary enlargement thereof more clearly depicting its action;

Fig. 3 is a view similar to Fig. 1 showing another embodiment of the invention; and Fig. 4 is a view similar to Fig. 2 but illustrating the action of the second embodiment.

Referring more particularly to the accompanying drawing, the numeral 1 designates a wiper or wiping blade and 2 its actuating shaft. The wiper arm assembly by which the shaft oscillates the blade over the windshield is attached to the shaft by a clamping nut 3 and comprises a shaft carried inner section or mounting part 4, an intermediate section 5, which is pivotally connected to the mounting part by a pin 6, and an outer section having independently related arms 7 and 8 which are carried by the intermediate section 5. These arms preferably are inherently resilient and may, therefore, be in the form of leaf springs. The arm 7 extends to and is connected by a suitable means, such as a clip 9, to the outer end portion of the wiper and is, therefore, relatively longer than the arm 8 which extends to and is connected by a suitable clip 10 to the inner end portion of the wiper. So as to exert uniform pressure on the wiper throughout its length, the longer arm 7 may be comparatively heavier or stiffer.

The longer arm 7, according to the embodiment illustrated in Fig. 1, is fixed to the intermediate member by a suitable fastener, such as the rivet 11, and is extended at its inner end portion, as at 13, to bear under tension upon a support 12 carried by the mounting part 4. The spring action of this inner extremity 13 on the support 12 will urge the intermediate member 5 together with the arms 7 and 8 toward the windshield glass and thereby afford the desired wiping contact of the wiper therewith. The shorter arm 8 is connected indirectly to the intermediate member 5 through the arm 7 and for this reason it is connected to the longer arm by a suitable fastener, such as the rivet 14, so that both arms may yield from the intermediate member 5 as a unit by reason of the short length 15 of the longer arm intermediate the two rivets 11 and 14. The shorter arm is extended, as at 16, to overlie the pressure spring 13 and provide a multi-leaf spring construction.

The embodiment illustrated in Fig. 3 has the longer arm 7' secured to the intermediate member 5' by the fastener 11' and the shorter arm 8' likewise secured to the intermediate member by the fastener 14' so that both arms 7' and 8' may flex from their respective fixed points of anchorage 11' and 14'.

In both forms of the invention the respective ends of the long wiper are given independent support which permits such end portions to bear resiliently on the glass and yield with respect to any obstruction independently of each other. Furthermore, if the inner end of the wiper should tend to adhere more than the faster moving outer end, the arm 8 may yield or flex to permit the slower moving inner end of the wiper to drag behind and even become displaced laterally from beneath the longer arm 7.

By reason of the independent and flexible mounting of the opposite end portions of the long wiper, the pressure in the wiping contact may be more readily determined and controlled for greater wiping efficiency. Furthermore, the two leaf spring arms are afforded different points of anchorage, the shorter arm 8 in Fig. 1 being given a floating anchorage at 14 while arm 7 is fixed at 11, whereas in Fig. 3 both arms are fixed at 11' and 14', respectively, to the intermediate member.

It will be understood that the embodiments described and shown herein are merely illustrative of the inventive principles here involved, which may be applied to other physical embodiments without departing from the spirit or scope of the invention claimed.

What is claimed is:

1. A wiper arm assembly having a mounting part for attachment to an actuating shaft, an intermediate member pivotally connected to the mounting part, and a pair of wiper carrying members on the intermediate member each in the form of a leaf spring and one extending beneath the other and movable relatively thereto at their outer ends, such outer ends adapted for attachment to a wiper and each exerting an independent spring pressure on the wiper.

2. A wiper arm assembly having a mounting part for attachment to an actuating shaft, an intermediate member pivotally connected to the mounting part, and a pair of wiper carrying members mounted on the intermediate member and having free end portions extending divergently therefrom, said free end portions being adapted for attachment to a wiper.

3. A wiper arm assembly having a mounting part for attachment to an actuating shaft, an intermediate member pivotally connected to the mounting part, and a pair of resilient members carried by the intermediate member and extending therefrom in the same general direction with one of said resilient members being shorter than the companion resilient member and extending divergently therefrom to space their free end portions, and each free end portion being adapted for attachment to a wiper.

4. A wiper arm assembly having a mounting part for attachment to an actuating shaft, an intermediate member pivotally connected to the mounting part, a resilient member fixed to said intermediate member and projecting outwardly therefrom to support a wiper adjacent one end, and a second resilient member fixed to said intermediate member and projecting outwardly therefrom independently of the first resilient member to support the same wiper adjacent its opposite end.

5. A wiper arm assembly having a mounting part for attachment to an actuating shaft, an intermediate member pivotally connected to the mounting part, a resilient member fixed to said intermediate member and projecting outwardly therefrom to support a wiper adjacent one end, and a second resilient member fixed to said first resilient member to support the same wiper adjacent its opposite end.

6. A wiper arm assembly having a mounting part for attachment to an actuating shaft, an intermediate member pivotally connected to the mounting part, a resilient member fixed to said intermediate member and projecting outwardly therefrom to support a wiper adjacent one end, the inner end of the resilient member extending to and resting under tension upon a support on the mounting part for urging the outer end and the intermediate member toward the surface being wiped, and a second resilient member projecting outwardly from the intermediate member to support the opposite end of the same wiper.

7. A wiper arm assembly having a mounting part for attachment to an actuating shaft, an intermediate member pivotally connected to the mounting part, a resilient member fixed to said intermediate member and projecting outwardly therefrom to support a wiper adjacent one end, the inner end of the resilient member extending to and resting under tension upon a support on the mounting part for urging the outer end and the intermediate member toward the surface being wiped, and a second resilient member projecting outwardly from the intermediate member to support the opposite end of the same wiper, the inner end of the second resilient member overlying the inner end portion of the first resilient member to reinforce the same.

ERWIN C. HORTON.